United States Patent [19]

Kostinko

[11] Patent Number: 4,623,631
[45] Date of Patent: Nov. 18, 1986

[54] FILTRATION OF ZEOLITES

[75] Inventor: John A. Kostinko, Bel Air, Md.

[73] Assignee: J. M. Huber Corporation, Locust, N.J.

[21] Appl. No.: 602,032

[22] Filed: Apr. 19, 1984

[51] Int. Cl.⁴ ............................................. B01J 20/18
[52] U.S. Cl. ..................................... 502/60; 210/772
[58] Field of Search .................. 502/60; 210/772, 769; 423/328, 329

[56] References Cited

U.S. PATENT DOCUMENTS

| | | | |
|---|---|---|---|
| 3,382,039 | 5/1968 | Calmon et al. | 502/60 |
| 4,041,135 | 8/1977 | Williams et al. | 423/329 |
| 4,260,495 | 4/1981 | Bennoit et al. | 210/772 |

FOREIGN PATENT DOCUMENTS

| | | | |
|---|---|---|---|
| 1134800 | 11/1982 | Canada | 502/60 |
| 61618 | 4/1982 | Japan | 502/60 |
| 1003266 | 9/1965 | United Kingdom | 502/60 |

Primary Examiner—Carl F. Dees
Attorney, Agent, or Firm—Harold H. Flanders; Robert L. Price

[57] ABSTRACT

The filtration of zeolites, for example sodium alumino silicates, from aqueous slurries containing the zeolites is improved by washing the filter cake with an aqueous solution of any salt which has the capacity to produce a stabilized slurry of the zeolite. Suitable salts include alkali metal carbonates, bicarbonates, sulphates and salts of organic acids.

11 Claims, No Drawings

FILTRATION OF ZEOLITES

FIELD OF THE INVENTION

This invention relates to methods for the improved filtration of zeolites and more particularly to improved methods for filtering zeolite solids from zeolite slurries and washing with aqueous solutions of salts to provide a zeolite filter cake of improved purity.

BACKGROUND OF THE INVENTION

Zeolites are hydrated alkali metal alumino silicates which are both naturally occurring and synthetically produced. The synthetic zeolites have compositions similar to the natural zeolites and the most common of these zeolites are chemically, sodium alumino silicates. Zeolites consist basically of a three-dimensional framework of $SiO_4$ and $AlO_4$ tetrahedra which are cross-linked by the sharing of oxygen atoms so that the ratio of oxygen atoms to the total of aluminum and silicon atoms is equal to 2 or $O/(Al+Si)=2$. The electrovalence of each tetrahedra containing aluminum is balanced by the inclusion in the crystal of a cation such as a sodium ion. The spaces between the tetrahedra are occupied by water molecules prior to dehydration.

Zeolites are classified on the basis of their adsorption characteristics particularly on the basis of the size and shape of the adsorbate molecule. Thus they are often called molecular sieves. Molecular sieves have adsorption areas on the interior of a large number of uniformly sized pores of molecular dimensions. With such an arrangement molecules of a certain size and shape enter the pores and are adsorbed while larger or differently shaped molecules are excluded. Zeolites are generally identified by letter designation such as zeolite A, zeolite X or zeolite Y and these materials are distinguished from other zeolites and silicates on the basis of their X-ray powder diffraction patterns and physical characteristics, including pore size opening. The basic formula for crystalline sodium zeolites may be represented as follows:

$$Na_2O.Al_2O_3.xSiO_2.yH_2O$$

In general a specific zeolite will have values for x and y that fall in a definite range. The value of x for a particular zeolite will vary somewhat since the aluminum atoms and the silicon atoms occupy essentially equivalent positions in the lattice. For zeolite A, an average value for x is about 1.85 with the x value falling within the range $1.85\pm0.5$. For zeolite X, the x value falls within the range $2.5\pm0.5$. Zeolites are well known in the art and are produced synthetically for example in accordance with the teachings of U.S. Pat. Nos. 2,882,243, 2,982,612 and 3,058,805 for zeolite A and 2,882,244 and 2,979,381 for zeolite X. References to the zeolites may of course be found in many other patents and publications.

Synthetic zeolites or sodium alumino silicates are prepared for the reaction of sodium silicate and sodium aluminate. When these reactants are mixed there is formed a reaction mixture which will contain water, sodium oxide, silica and alumina. A reaction of this type is disclosed in U.S. Pat. No. 4,041,135 to Williams et al, commonly assigned, in which process the reaction mixture includes molar ratios of these reactants as follows:
$H_2O:Na_2O$ 35:1 to 200:1 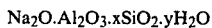
$Na_2O:SiO_2$ 0.8:1 to 3:1
$SiO_2:Al_2O_3$ 0.5:1 to 2.5:1

The reaction is carried out at a temperature ranging from about 70° to 180° C. Normally in processes of this type, after completion of the reaction, the temperature of the mixture is then elevated to permit the intermediate amorphous product to crystallize to the desired zeolite product. Thereafter the solid zeolite is recovered by separation from the liquid or mother liquor, preferably by filtration. The resulting wet cake is then spray dried after washing to produce the final product.

It is a problem in separation of the zeolite product from its mother liquors to obtain a suitable level of purity of the product prior to drying. The present invention provides a method by which highly pure zeolites can be produced in the filtration process.

SUMMARY OF THE INVENTION

It is one object of the present invention to provide a method for the preparation of synthetic zeolites by improvements in the separation processes.

A further object of the invention is to provide a method for improving the purity of the solid zeolite during the separation process from its mother liquor.

A still further object of the invention is to provide a method for filtering slurries of synthetic zeolites produced by the reaction of sodium aluminate and sodium silicate while reducing the water wash requirements and improving the purity of the zeolite.

Further objects and advantages of the present invention will become apparent as the description thereof proceeds.

In satisfaction of the foregoing objects and advantages there is provided by this invention a method for increasing the purity of zeolites produced by the synthetic process and decreasing the requirements for wash water quantities, which comprises subjecting a slurry of a synthetically produced zeolite to a filtration process to remove the mother liquor in which the reaction was inducted, and then washing the zeolite with an aqueous solution of a salt wherein the salt is any salt which is effective to produce a stabilized slurry of the zeolite.

DESCRIPTION OF THE PREFERRED EMBODIMENT

As indicated above the present invention is concerned with methods for the production of synthetic zeolites with increased levels of purity prior to drying and decreased requirements in the solids washing process. As indicated the reaction of sodium aluminate and sodium silicate under known conditions produces an amorphous sodium alumino silicate or zeolite which is then crystallized by known methods. At the conclusion of the crystalization process there is provided a solid zeolite or sodium alumino silicate contained in an aqueous mixture which is an aqueous solution of the ions which were not reacted during the process. This aqueous mixture is referred to as the mother liquors. In the conventional manner for the production of the zeolites, the slurry of zeolite in the mother liquor is filtered to remove the major amount of mother liquor. The crystals on the filter cake or wet cake are then washed with water to remove as much of the mother liquor as possible. Thereafter the wet cake is subjected to spray drying to provide the solid dried sodium alumino silicate. This general procedure is known to be a conventional procedure for zeolite A, zeolite X, zeolite Y or any of the other known zeolitic materials. A process of this type is described for example in U.S. Pat. No. 4,041,135.

It is known that the initial filtration step, which is usually by vacuum filtration, and conventional washing with water of the zeolite becomes progressively difficult as the degree of washing increases. As a result, the zeolite begins to form a hard cake so that it is difficult to wash the crystals to an acceptable level of purity prior to drying. The filtration rates decrease rapidly as the degree of washing increases and can become difficult or impossible when a very high degree of washing is desired.

The present invention provides a method which permits a high degree of washing at a very rapid rate. The method is based on the discovery that at least a portion of the washing step should be conducted using a dilute aqueous salt solution rather than pure water. The method of the invention provides advantages in permitting the washing step to be carried out at a very rapid rate, reducing the amount of wash water required and also reducing the time necessary to provide a product having the desired purity. The salt from which the salt washing solution is produced can be any salt which has the capacity to produce a stabilized slurry of the zeolite. By this is meant that a characteristic of the salt is that it can be added to an aqueous slurry of the zeolite and will produce a slurry which is stabilized in suspension and will not flocculate on standing. The concentration of the salt solution is limited only by the solubility of the salt and the point at which the amount of salt increases the viscosity of the zeolite slurry to a consistency which is unacceptable for pumping equipment or the like. The preferred concentration of the salt solution will range from about 0.5 weight percent up to about 10 weight percent and preferably the salt solution has a concentration of about 1 to 5 weight percent as this is satisfactory to achieve the objects of the method of the invention.

Suitable salts for use in producing the salt solution include salts of alkali metals and organic salts. In particular, it is preferred that the salt be a sodium salt such as $NaHCO_3$, $NaCl$, $Na_2CO_3$, $Na_2SO_3$, $Na_2SO_4$ and the like. In addition organic salts such as $C_6H_5Na_3O_7.2H_2O$, ethylene-diamine-tetra-acetic acid and $Na_4PO_2O_7$ may be used. These salts are preferred because of their ability to produce a stable zeolite slurry while maintaining low viscosity.

It is also possible to use salts of other metals such as potassium salts or alkaline earth metal salts such as calcium salts. However, because of the characteristics of zeolites to exchange ions, it is necessary to use salts other than sodium salts or organic salts with care because the salt solution may change the zeolite designation during the washing step. Thus, if zeolite A is washed with a sodium salt, the product is zeolite 4A. If a potassium salt is used the zeolite resulting from zeolite A will be zeolite 3A and if calcium salt is used, the zeolite will be zeolite 5A. Accordingly, this limitation is to be placed on the salts to be used in the process.

In conventional filtration of zeolite slurries the filter cake at the conclusion of the filtration and washing step will be packed down in the filter. However according to the present invention wherein at least a portion of the wash water is the salt solution indicated, the cake is not packed down and is easier to handle. Further the cake is of improved purity and the time for conducting the washing step is substantially reduced.

In a preferred aspect of the invention, the initial washing of the filter cake will be conducted with pure water up to the point where filtration time begins to significantly decrease. At this point, the washing should be continued with the salt solution. This is a particularly preferred aspect because it permits for recovery and recycle of most of the chemical values in the mother liquor without contamination from the salt solution. The mother liquor may then be reused in the process as described for example in U.S. Pat. No. 4,041,135. The washing step can then be continued with the salt solution to take advantage of the faster filtration rates. The remaining liquors in the zeolite and the salt solution can then be purged from the system. This approach will maximize both mother liquor recovery and filtration rates.

An additional advantage of the method of the invention will be obtained in the spray drying process to which zeolite slurries are subjected after the washing step. The heat and the carbon dioxide atmosphere of a spray drier will convert available alkali in the zeolite slurry into sodium carbonate. Conventionally dried zeolite powders contain up to 2% sodium carbonate. For this reason sodium carbonate and sodium bicarbonate are the most preferred salts to be used in the washing process since the final product will not contain any impurities that are not normally present in a product which is washed in a conventional manner.

The invention has been described with reference particularly to the washing of zeolite slurries. However the method is considered to have value in the filtration of any solid for which an acceptable stabilizing agent is available. For example the production of titanium dioxide requires the incorporation of a washing step prior to drying or shipment as a slurry. Stabilizing agents such as acrylic copolymers can be used to prevent settlement of the titanium dioxide slurries to achieve better washing efficiency and improved filtration rates.

The following examples are presented to illustrate the invention but the invention is not to be considered as limited thereto. In the examples and throughout the specification, parts are by weight unless otherwise indicated.

EXAMPLE

In this example a zeolite A batch was prepared from the reaction of sodium aluminate and sodium silicate. The method chosen was the method described for example in U.S. Pat. No. 4,416,805 of the same inventor. In this preparation, a sodium silicate solution containing 1.9% sodium oxide and 4.6% silica was heated to 90° C. A preheated sodium aluminate solution containing 26.8% sodium oxide and 6.8% alumina was then added to the sodium silicate within about 30 seconds. The resulting amorphous material or gel was broken down by agitation until a homogeneous slurry was obtained. The batch was then reacted at 100° C. for four hours. The total batch composition had a $H_2O:Na_2O$ molar ratio of about 30:1, an $Na_2O:SO_2$ molar ratio of about 3.0:1 and an $SiO_2:Al_2O_3$ molar ratio of about 2.5:1. On completion of the heating step at 100° C. to form the crystalized product, the resulting slurry of zeolite was then split into two equal portions. The purpose of the two portions was to wash one portion conventionally with water, the second portion with an aqueous solution of a salt. For each wash the slurry was diluted with a fixed amount of water, filtered and the $SiO_2$ content of the filtrate analyzed to determine the degree of washing. Portion A received only pure water washing. Portion B was washed with a 1% sodium bicarbonate solution. The water washes, filtration time and silica in the filtrate are set forth in the following table:

| Wash No. | Portion A Water Wash | | Portion B 1% NaHCO₃ Wash | |
|---|---|---|---|---|
| | Filtrate SiO$_2$, ppm | Filtration Time, Min. | Filtrate SiO$_2$, ppm | Filtration Time, Min. |
| 1 | 10,800 | 35 | 14,500 | 55 |
| 2 | 6,800 | 29 | 9,525 | 38 |
| 3 | 4,025 | 29 | 5,025 | 42 |
| 4 | 1,900 | 52 | 2,900 | 30 |
| 5 | 1,150 | 152 | 1,150 | 30 |
| 6 | 575 | 173 | 150 | 34 |
| 7 | 375 | 250 | 150 | 47 |
| | | 720 Total | | 276 Total |

From the above table it will be noted that the filtration time for portion B is only about ⅓ that of portion A which illustrates the significant time advantages achieved using the process of the invention with the salt solution washing. It will also be noted that the concentration of SiO$_2$ in the filtrate in portion B is substantially reduced. Further less wash solution was required to achieve a high degree of washing thus illustrating the advantages achieved by the method of the present invention.

The invention has been described herein with reference to certan preferred embodiments. Therefore the invention is not to be considered as limited thereto as obvious variations thereon will become apparent to those skilled in the art.

What is claimed is:

1. A method for the filtration and washing of zeolite solids in their separation from aqueous slurries containing the solids which comprises filtering the zeolite solids to remove a major portion of the aqueous components of the slurry and provide a wet filter cake of the zeolite solid, then washing the filter cake with an aqueous solution, at least a portion of the aqueous solution comprising a dilute solution of salt, the salt being one which is effective to stabilize an aqueous slurry of the zeolite solids-aqueous solution mixture and to prevent flocculation, and recovering the washed filter cake.

2. A method for the separation of solid zeolites of improved purity from aqueous slurries containing said zeolites, which comprises filtering said aqueous slurry to separate the aqueous component from the solid component and then washing the filter cake of said solid component with an aqueous solution, at least a portion of the aqueous solution comprising a dilute solution of a salt, the salt being a salt which is capable of producing a stabilized slurry of the zeolite and preventing flocculation.

3. A method according to claim 2, wherein the zeolite is a sodium alumino silicate selected from the group consisting of zeolite A, zeolite X, zeolite Y and mixtures thereof.

4. A method according to claim 3, wherein the zeolite is prepared by the reaction of sodium aluminate and sodium silicate in an aqueous mixture and wherein the aqueous mixture contains silica, alumina, sodium oxide, and water.

5. A method according to claim 4, wherein the salt solution is an inorganic salt of an alkali metal or an organic salt.

6. A method according to claim 5, wherein the salt is selected from the group consisting of sodium bicarbonate, sodium chloride, sodium carbonate, sodium sulphite, sodium sulphate, $C_6H_5Na_3O_7.2H_2O$, ethylene-diamine-tetra-acetic acid, $Na_4P_2O_7$.

7. In a method for the production of a zeolite by the reaction of sodium aluminate and sodium silicate to produce an intermediate amorphous or gel product and then increasing the temperature of the reaction mixture to form a crystalized sodium alumino silicate zeolite contained as an aqueous slurry, filtering the aqueous slurry to separate the mother liquor from the wet cake of the zeolite, and washing the wet filter cake to remove impurities, and spray drying the resulting filter cake to produce the dried zeolite, the improvement comprising washing the filter cake of said zeolite with a dilute aqueous solution of a salt which is capable of producing a stabilized slurry of the zeolite and preventing flocculation.

8. A method according to claim 7, wherein the wet cake is initially washed with pure water until filtration time begins to significantly increase and then continuing the washing with a dilute solution of the salt.

9. A method according to claim 7, wherein the zeolite is a sodium alumino silicate selected from the group consisting of zeolite A, zeolite X, zeolite Y and mixtures thereof.

10. A method according to claim 7, wherein the salt solution is an inorganic salt of an alkali metal or an organic salt.

11. A method according to claim 10, wherein the salt is selected from the group consisting of sodium bicarbonate, sodium chloride, sodium carbonate, sodium sulphite, sodium sulphate, $C_6H_5Na_3O_7.2H_2O$, ethylene-diamine-tetra-acetic acid, $Na_4P_2O_7$.

* * * * *